US010983815B1

(12) United States Patent
Barry et al.

(10) Patent No.: US 10,983,815 B1
(45) Date of Patent: Apr. 20, 2021

(54) SYSTEM AND METHOD FOR IMPLEMENTING A GENERIC PARSER MODULE

(71) Applicant: JPMorgan Chase Bank, N.A., New York, NY (US)

(72) Inventors: Michael J. Barry, Lithia, FL (US); Stephanie Chang, Riverview, FL (US); Andrew Barbanera, Tampa, FL (US); Adam Gerber, Riverview, FL (US); Nathan Bender, Riverview, FL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 15 days.

(21) Appl. No.: 16/669,879

(22) Filed: Oct. 31, 2019

(51) Int. Cl.
  *G06F 9/455* (2018.01)
  *G06F 16/11* (2019.01)
  *G06F 8/35* (2018.01)

(52) U.S. Cl.
  CPC .......... *G06F 9/45529* (2013.01); *G06F 8/35* (2013.01); *G06F 16/116* (2019.01)

(58) Field of Classification Search
  None
  See application file for complete search history.

(56) References Cited

U.S. PATENT DOCUMENTS

| | | | |
|---|---|---|---|
| 2004/0015840 A1* | 1/2004 | Walker | G06F 9/465 717/108 |
| 2009/0228863 A1* | 9/2009 | Nigul | G06F 8/73 717/104 |
| 2013/0212568 A1* | 8/2013 | Huang | G06F 8/458 717/146 |
| 2014/0222957 A1* | 8/2014 | Gangadharan | H04L 67/141 709/217 |
| 2015/0089474 A1* | 3/2015 | Jain | G06F 9/45525 717/121 |

* cited by examiner

Primary Examiner — Qing Chen
(74) Attorney, Agent, or Firm — Greenblum & Bernstein, P.L.C.

(57) ABSTRACT

Various methods, apparatuses/systems, and media for implementing a generic parser module are disclosed. A repository that stores a plurality of files each having a corresponding file format. A processor accesses the repository to obtain the plurality of files and format each file into a class-based logical hierarchy. The processor also creates a Java model based on the formatted files having the class-based logical hierarchy, each file having a plurality of data and the Java model having file-level classes that contain a list of said plurality of data; generates Java annotations identifying each file type included in the file-level classes; injects the Java annotations into the file-level classes of the Java model to indicate how to process each file; calls a method along with the file containing the data; and parses the file to read the data into the Java model injected with the Java annotations.

20 Claims, 4 Drawing Sheets

SYSTEM AND METHOD FOR IMPLEMENTING A GENERIC PARSER MODULE

TECHNICAL FIELD

This disclosure generally relates to parsing of files, and, more particularly, to methods and apparatuses for implementing a generic parser module for parsing certain types of files available for Java language.

BACKGROUND

Conventional tools lack framework or open source for parsing certain types of files, e.g., certain types of banking files, including but not limited to, Electronic Data Interchange (EDI) files, Bank Administration Institute (BAI) files, Pascal (PAS) files, etc. An EDI file is a data file formatted using one of several EDI standards. The EDI file may contain structured data stored in a plain text format and may be used for transferring business data between multiple organizations, A BAI file format is a file format for performing electronic cash management balance reporting. PAS is an extension given to a program file that may contain source code written in Pascal or Object Pascal. PAS files may be edited with a Pascal development program or a basic text editor.

Although there may be some conventional tools that may be available for each individual file (e.g., EDI file, BAI file, or PAS file), such conventional tools fail to provide a generic framework for allowing parsing of any types of file having varying file formats. For example, a conventional tool that may parse an EDI file, may not be able to parse a BAI file or a PAS file, and vice versa. Similarly, a conventional tool that may parse a BAI file, may not be able to parse an EDI file or a PAS file, and vice versa. The conventional tool may provide extensible markup language (XML) configurations to represent what the file may look like logically, which may prove to be complex and time consuming. In addition, the conventional tool may not be configured to use the same configuration for both parsing and generation of files.

SUMMARY

The present disclosure, through one or more of its various aspects, embodiments, and/or specific features or sub-components, provides, among other features, various systems, servers, devices, methods, media, programs, and platforms for implementing a generic parser module that may allow for generically parsing certain types of files available for Java language without requiring to generate XML configuration files, thereby reducing complexity and improving efficiency of parsing tools, but the disclosure is not limited thereto. Further, the present disclosure, through one or more of its various aspects, embodiments, and/or specific features or sub-components, provides, among other features, various systems, servers, devices, methods, media, programs, and platforms for implementing a generic parser module that may allow for generically parsing certain types of files available for Java language by utilizing Java annotations for file models instead of XML configurations and utilizing the same configuration for both parsing and generation of files, thereby improving efficiency of parsing tools, but the disclosure is not limited thereto.

According to an aspect of the present disclosure, a method for implementing a generic parser module by utilizing one or more processors and one or more memories is disclosed. The method may include: accessing a repository to obtain a plurality of files each having a corresponding file format; formatting each file into a class-based logical hierarchy; creating a Java model based on the formatted files having the class-based logical hierarchy, each file having a plurality of data and the Java model having file-level classes that contain a list of said plurality of data; generating Java annotations identifying each file type included in the file-level classes; injecting the Java annotations into the file-level classes of the Java model to indicate how to process each file; calling a method along with the file containing the data; and parsing the file to read the data into the Java model injected with the Java annotations.

According to a further aspect of the present disclosure, the method may further include: utilizing a reflection method to search the file-level classes subjected for parsing that represent each file as the class-based logical hierarchy.

According to another aspect of the present disclosure, each file may be selected from one or more of the following file types: an electronic data interchange (EDI) file, a bank administration institute (BAI) file, and a Pascal (PAS) file, but the disclosure is not limited thereto.

According to a yet another aspect of the present disclosure, the Java model may include a root level model that may indicate a file-level annotations and an interior field that may indicate the data of the file.

According to a further aspect of the present disclosure, the interior field may include a field order annotation along with a property indicating an order of each field.

According to another aspect of the present disclosure, the method may further include: generating files based on the Java model containing the data.

According to an additional aspect of the present disclosure, wherein in calling a method may further include: calling a method having four input parameters, wherein the four input parameters include the file itself, a type of Java model to parse the file into, a character number in the file containing a field separator, and a character number in the file containing a line separator.

According to yet another aspect of the present disclosure, wherein in calling a method may further include: calling a method having two input parameters, wherein the two input parameters include the file with the data and a type of Java model for the data to be read into.

According to another aspect of the present disclosure, a system for implementing a generic parser module is disclosed. The system may include a repository having one or more memories configured to store a plurality of files each having a corresponding file format and a processor operatively connected to the repository via a communication network. The processor may be configured to: access the repository to obtain the plurality of files; format each file into a class-based logical hierarchy; create a Java model based on the formatted files having the class-based logical hierarchy, each file having a plurality of data and the Java model having file-level classes that contain a list of said plurality of data; generate Java annotations identifying each file type included in the file-level classes; inject the Java annotations into the file-level classes of the Java model to indicate how to process each file; call a method along with the file containing the data; and parse the file to read the data into the Java model injected with the Java annotations.

According to a further aspect of the present disclosure, the processor may be further configured to: utilize a reflection method to search the file-level classes subjected for parsing that represent each file as the class-based logical hierarchy.

According to yet another aspect of the present disclosure, the processor may be further configured to generate files based on the Java model containing the data.

According to an additional aspect of the present disclosure, the processor may be further configured to call a method having four input parameters, wherein the four input parameters include the file itself, a type of Java model to parse the file into, a character number in the file containing a field separator, and a character number in the file containing a line separator.

According to a further aspect of the present disclosure, the processor may be further configured to call a method having two input parameters, wherein the two input parameters include the file with the data and a type of Java model for the data to be read into.

According to another aspect of the present disclosure, a non-transitory computer readable medium configured to store instructions for implementing a generic parser module is disclosed. The instructions, when executed, may cause a processor to perform the following: access a repository to obtain a plurality of files each having a corresponding file format; format each file into a class-based logical hierarchy; create a Java model based on the formatted files having the class-based logical hierarchy, each file having a plurality of data and the Java model having file-level classes that contain a list of said plurality of data; generate Java annotations identifying each file type included in the file-level classes; inject the Java annotations into the file-level classes of the Java model to indicate how to process each file; call a method along with the file containing the data; and parse the file to read the data into the Java model injected with the Java annotations.

According to yet another aspect of the present disclosure, the instructions, when executed, may further cause the processor to perform the following: utilize a reflection method to search the file-level classes subjected for parsing that represent each file as the class-based logical hierarchy.

According to a further aspect of the present disclosure, the instructions, when executed, may further cause the processor to perform the following: generate files based on the Java model containing the data.

According to an additional aspect of the present disclosure, the instructions, when executed, may further cause the processor to further perform the following: call a method having four input parameters, wherein the four input parameters include the file itself, a type of Java model to parse the file into, a character number in the file containing a field separator, and a character number in the file containing a line separator.

According to yet another aspect of the present disclosure, the instructions, when executed, may further cause the processor to further perform the following: call a method having two input parameters, wherein the two input parameters include the file with the data and a type of Java model for the data to be read into.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

Figure 1:
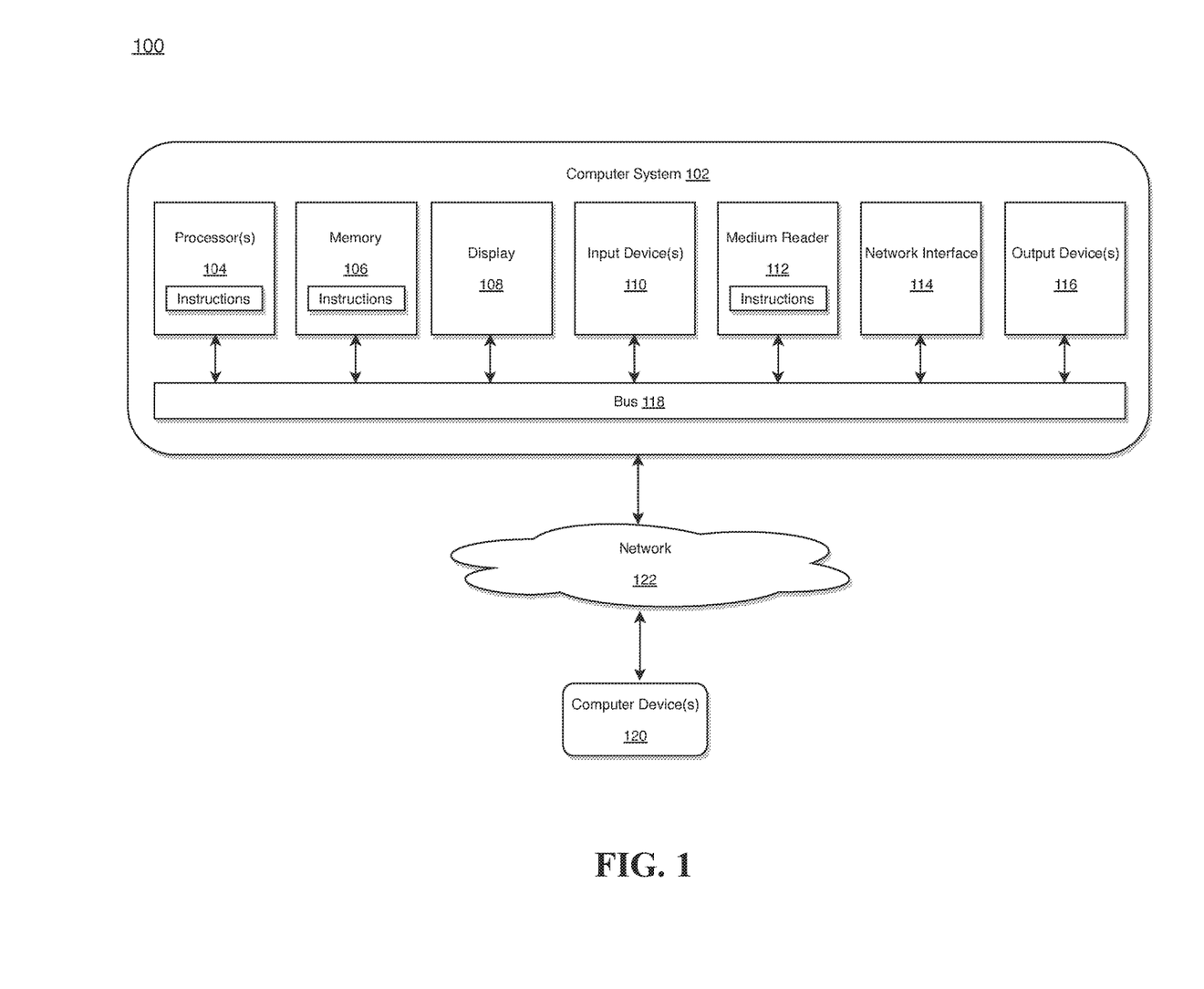
FIG. 1 illustrates a computer system for implementing a generic parser module in accordance with an exemplary embodiment.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

As described herein, various embodiments provide optimized processes of implementing a generic parser module that may allow for generically parsing certain types of files available for Java language without requiring to generate XML configuration files, but the disclosure is not limited thereto. Further, as described herein, various embodiments provide optimized processes of implementing a generic parser module that may allow for generically parsing certain types of files available for Java language by utilizing Java annotations for file models instead of XML configurations and utilizing the same configuration for both parsing and generation of files, thereby improving efficiency of parsing tools, but the disclosure is not limited thereto.

Figure 2:
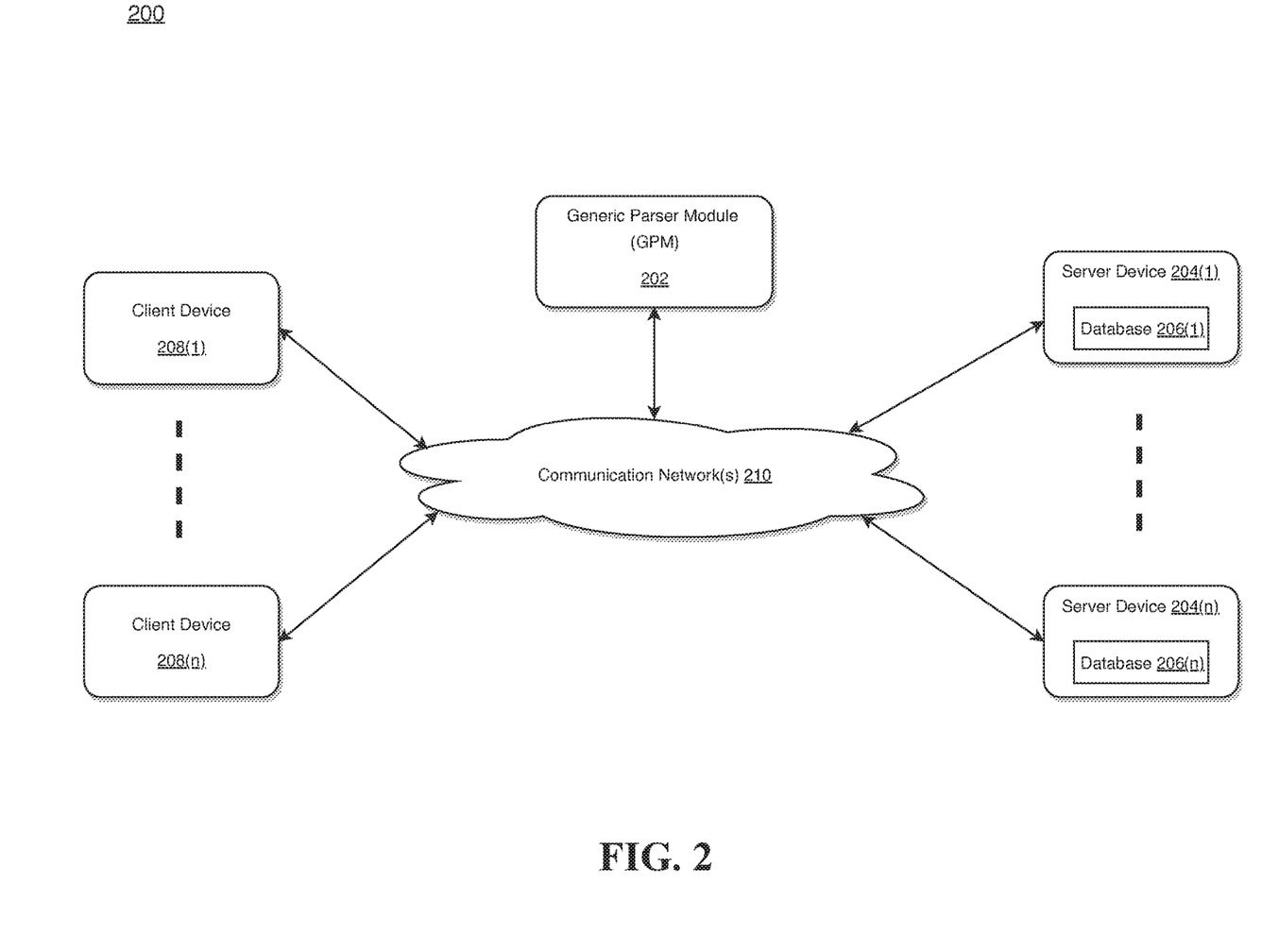
FIG. 2 illustrates an exemplary diagram of a network environment with a generic parser module in accordance with an exemplary embodiment.

Referring to FIG. 2, a schematic of an exemplary network environment 200 for implementing a generic parser module (GPM) of the instant disclosure is illustrated.

Conventional system, that does not implement a GPM of the instant disclosure, may not be able to generically parse certain types of files available for Java language and may require to generate XML configuration files to process each file type individually. In addition, conventional system, that does not implement a GPM of the instant disclosure, may not be able to use the same configuration for both parsing and generation of files.

According to exemplary embodiments, the above-described problems associated with conventional approach may be overcome by implementing a GPM 202 as illustrated in FIG. 2. The GPM 202 may be the same or similar to the computer system 102 as described with respect to FIG. 1. According to exemplary embodiments, the GPM 202 may be considered to be a two-way interactive communication device such as a mobile computing device, cellular phone, landline phone or an Internet appliance controller.

The GPM 202 may store one or more applications that can include executable instructions that, when executed by the GPM 202, cause the GPM 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the GPM 202 itself, may be located in virtual server(s) running in a cloud-based computing environment rather than being tied to one or more specific physical network computing devices. Also, the application(s) may be running in one or more virtual machines (VMs) executing on the GPM 202. Additionally, in one or more embodiments of this technology, virtual machine(s) running on the GPM 202 may be managed or supervised by a hypervisor.

In the network environment 200 of FIG. 2, the GPM 202 is coupled to a plurality of server devices 204(1)-204(n) that hosts a plurality of databases 206(1)-206(n), and also to a plurality of client devices 208(1)-208(n) via communication network(s) 210. A communication interface of the GPM 202, such as the network interface 114 of the computer system 102 of FIG. 1, operatively couples and communicates between the GPM 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the GPM 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet based Packet Data Networks (PDNs), combinations thereof, and the like.

The GPM 202 may be a standalone device or integrated with one or more other devices or apparatuses, such as one or more of the server devices 204(1)-204(n), for example. In one particular example, the GPM 202 may be hosted by one of the server devices 204(1)-204(n), and other arrangements are also possible. Moreover, one or more of the devices of the GPM 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the GPM 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the GPM 202 that may efficiently provide a platform for allowing generic parsing of certain types of files available for Java language without requiring to generate XML configuration files, but the disclosure is not limited thereto. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example.

The client devices 208(1)-208(n) may run interface applications, such as standard web browsers or standalone client applications, which may provide an interface to communicate with the GPM 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the GPM 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the GPM 202, the server devices 204(1)-204(n), or the client devices 208(1)-208(n), for example, may be configured to operate as virtual instances on the same physical machine. For example, one or more of the GPM 202, the server devices 204(1)-204(n), or the client devices 208(1)-208(n) nay operate on the same physical device rather than as separate devices communicating through communication network(s) 210. Additionally, there may be more or fewer GPMs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
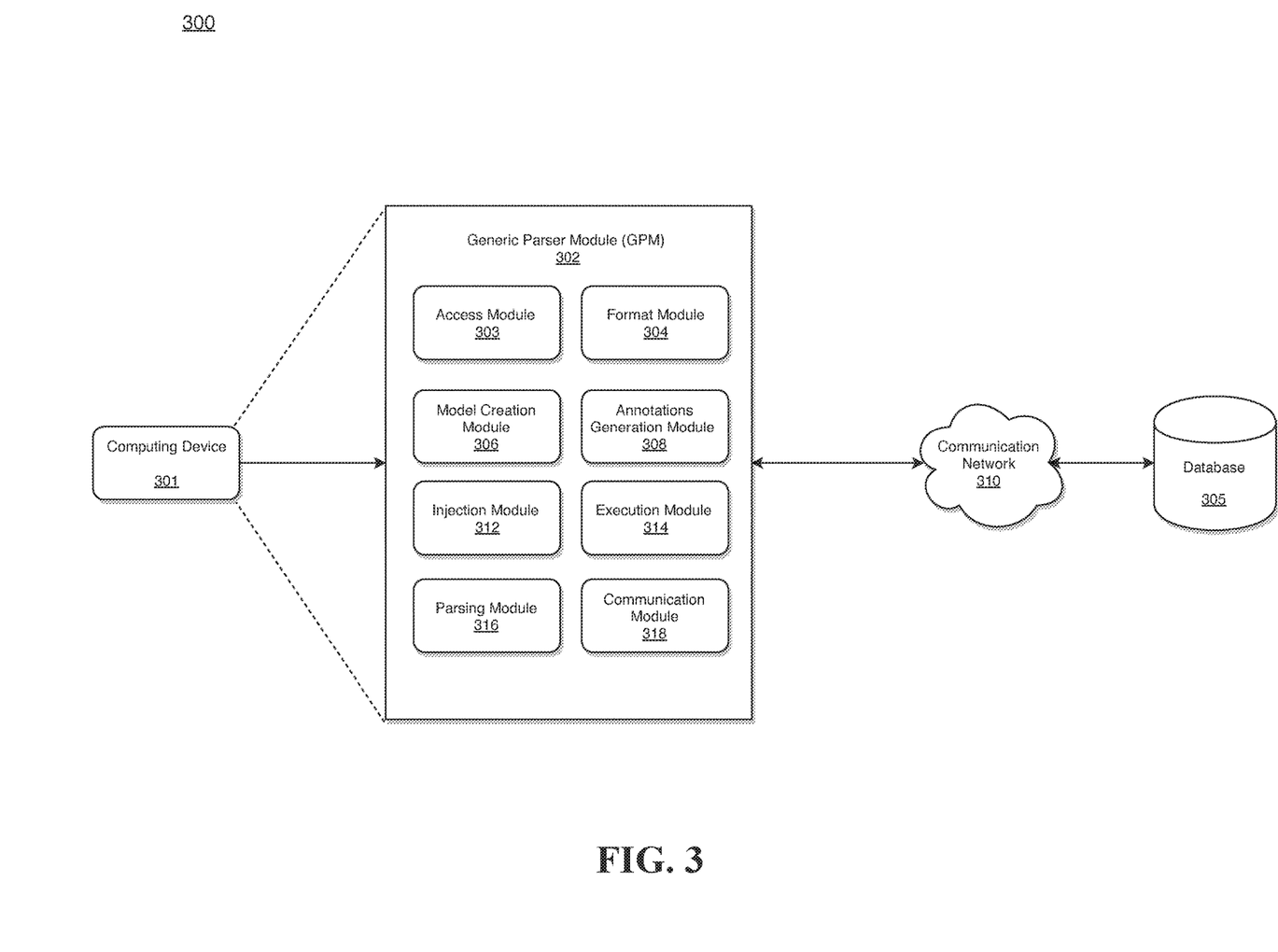
FIG. 3 illustrates a system diagram for implementing a generic parser module in accordance with an exemplary embodiment.

FIG. 3 illustrates a system diagram for implementing a GPM in accordance with an exemplary embodiment.

As illustrated in FIG. 3, the GPM 302 may be connected to a database 305 via a communication network 310. The database 305 may be a repository including one or more memories to store a plurality of files each having a corresponding file format. According to exemplary embodiments, the database 305 may be a Maven repository, but the disclosure is not limited thereto. The GPM 302 may be implemented within the computing device 301.

According to exemplary embodiment, the computing device 301 is described and shown in FIG. 3 as including the GPM 302, although it may include other rules, policies, modules, databases, or applications, for example.

As will be described below, the GPM 302 may be configured to execute automated parsing of files from a Java model by utilizing one or more processors and one or more memories disclosed herein.

As illustrated in FIG. 3, according to exemplary embodiments, the GPM 302 may include an access module 303, a format module 304, a model creation module 306, an annotations generation module 308, an injection module 312, an execution module 314, a parsing module 316, and a communication module 318.

According to exemplary embodiments, each of the access module 303, a format module 304, the model creation module 306, the annotations generation module 308, the injection module 312, the execution module 314, the parsing module 316, and the communication module 318 may be implemented by microprocessors or similar, they may be programmed using software (e.g., microcode) to perform various functions discussed herein and may optionally be driven by firmware and/or software. For example, each of the access module 303, a format module 304, the model creation module 306, the annotations generation module 308, the injection module 312, the execution module 314, the parsing module 316, and the communication module 318 may be implemented may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. Alternatively, each of the access module 303, a format module 304, the model creation module 306, the annotations generation module 308, the injection module 312, the execution module 314, the parsing module 316, and the communication module 318 may be implemented by dedicated hardware, or as a combination of dedicated hardware to perform some functions and a processor (e.g., one or more programmed microprocessors and associated circuitry) to perform other functions.

According to exemplary embodiments, the access module 303 may be configured to access the database 305 to obtain a plurality of files each having corresponding file format. For example, the database 305 may store a plurality of files including one or any combinations of files including, but not limited thereto, an electronic data interchange (EDI) file, a bank administration institute (BAT) file, and a Pascal (PAS) file.

According to exemplary embodiments, the format module 304 may be configured to format each file into a class-based logical hierarchy and the model creation module 306 may be configured to create a Java model based on the formatted files having the class-based logical hierarchy. According to exemplary embodiments, each file may include a plurality of data and the Java model having file-level classes which may contain a list of said plurality of data. The Java model may be stored into the database 305 for further processing or utilization.

According to exemplary embodiments, the annotations generation module 308 may be configured to generate Java annotations identifying each file type included in the file-level classes and the injection module 312 may be configured to inject the Java annotations into the file-level classes of the Java model created by the model creation module 306 to indicate how to process each file.

According to exemplary embodiments, the execution module 314 may be configured to call a method along with the file containing the data and the parsing module 316 may be configured to parse the file to read the data into the Java model injected with the Java annotations generated by the annotations generation module 308.

According to exemplary embodiments, the computing device 301 may be the same or equivalent to the computing device 201 as illustrated in FIG. 2, the database 305 may be the same or equivalent to the server device 204 as illustrated in FIG. 2, and the communication network 310 may be the same or equivalent to the communication network 210 as illustrated in FIG. 2, but the disclosure is not limited thereto.

The process of the GPM 302 may be executed via the communication network 310, which may comprise plural networks as described above. For example, in an exemplary embodiment, the various components of the GPM 302 may communicate with the database 305 that includes the data files and the Java models via the communication network 310 and the communication module 318. Of course, these embodiments are merely exemplary and are not limiting or exhaustive.

According to exemplary embodiments, the GPM 302 may be configured to utilize a reflection method to search the file-level classes subjected for parsing that represent each file as the class-based logical hierarchy.

According to exemplary embodiments, the Java model created by the model creation module 306 may include a root level model that may indicate a file-level annotations and an interior field that may indicate the data of the file. The interior field may include a field order annotation along with a property indicating an order of each field.

According to exemplary embodiments, the GPM 302 may be configured to generate files based on the Java model containing the data created by the model creation module 306.

According to exemplary embodiments, in calling a method, the execution module 314 may further be configured to call a method having four input parameters. The four input parameters may include the file itself, a type of Java model to parse the file into, a character number in the file containing a field separator, and a character number in the file containing a line separator.

Alternatively, according to exemplary embodiments, in calling a method, the execution module 314 may further be configured to call a method having two input parameters. The two input parameters may include the file with the data and a type of Java model for the data to be read into.

According to exemplary embodiments, parsing module 316 may be annotation driven. To utilize the parsing module 316, the system 300 may be configured to format the file in a logical hierarchy to Java model by utilizing the format module 304 and by utilizing Java annotations generated by the annotations generation module 308. The system 300 may be configured to utilize these annotations to allow the parsing module 316 to identify what types of segment or codes that the parsing module 316 is trying to read within the file by using a reflection method. That is, the GPM 302 may be configured to look through the class that are being parsed that represents the file logically. And the parsing module 316 may be configured to parse data from the file into that Java model created by the model creation module 306.

According to exemplary embodiments, the Java model may be created by utilizing the model creation module 306. For example, a file may contain many transactions, and each transaction may include different types of records within that transaction. Thus, a Java model may be created by the model creation module 306 so that a class based hierarchy may represent this file logically. For example, a file level Java class may contain a list of transactions objects. According to exemplary embodiments, the annotations generated by the annotations generation module 308 may be added to this Java class, such as segments that may help determine what type of information each record holds. After creation of the Java model by the model creation module 306, the Java model along with the files of data having the Java class may be sent to the parsing module 316 so that the parsing module 316 may read that file into a new object.

According to exemplary embodiments, the Java annotations may include file-level annotations depending on what type of file is accessed from the database 305. Each class, depending on if it is a segment or segment group or file, may need to include a field order segment that indicates in what order should the parsing module 316 look for these fields. According to exemplary embodiments, it is irrelevant in what order the fields are declared. The system 300 or the GPM 302 only considers the annotations, a segment, or a segment group or groups. For example, for an EDI file, first filed of each line may represent/identify what kind of data that line contains. For example, the first record may be a particular bank information. The GPM 302 may identify the parties associated with a particular transaction or account. Thus, a segment may represent a single line in the file. The GPM 302 may then pass a segment code that may identify what that data represents. And finally, the GPM 302 may utilize a segment group that may contain a grouping of multiple segments and can be annotated using segment group annotation. Segment groups may be important when it is necessary to group a set of segments together that may be repeated by the execution module 314 an unlimited number of times (loop) throughout the file infinitely many times as necessary.

According to exemplary embodiments, a field order subject may include a segment with a code that may represent an entity. For example, a segment associated with the transaction data accessed from the database 305 may include three different fields: 1) entity's name, 2) a qualifier, and 3) an identification code, e.g., a tax ID, but the disclosure is not limited thereto. The GPM 302 may be configured to recognize that these three fields may always exist in that order. Thus, the GPM 302 may be configured to utilize that field order annotations and indicate that the entity name is in order of one (first order) because it always appears first, the qualifier is in an order of two (second order) because it always appears second, and the identification is in an order of three (third order) because it always appears third. This is, just because in Java reflection, when the GPM 302 searches fields on a model, the fields are output back in the order they are declared. Thus, the GPM 302 may be configured to add the annotations to be able to identify what order to look for the field.

According to exemplary embodiments, the Java model created by the model creation module 306 may include file level annotation, e.g., annotation for an EDI file, so this will be on a root level model, and an interior filed will represent the data of the file. That is, in this example, there may be a header on the file that contains a metadata of the file and there may be a list of transactions. Using recursion/looping, the execution module 314 of the GPM 302 may utilize algorithms searching in each of the inner field until all inner fields are searched.

Thus, the present disclosure, through one or more of its various aspects, embodiments, and/or specific features or sub-components, provides, among other features, various systems, servers, devices, methods, media, programs, and platforms for implementing the GPM 302 that may allow for generically parsing certain types of files available for Java language without requiring to generate XML configuration files, thereby reducing system complexities and improving system performance for parsing, but the disclosure is not limited thereto. Further, the present disclosure, through one or more of its various aspects, embodiments, and/or specific features or sub-components, provides, among other features, various systems, servers, devices, methods, media, programs, and platforms for implementing the GPM 302 that may allow for generically parsing certain types of files available for Java language by utilizing Java annotations for file models instead of XML configurations and utilizing the same configuration for both parsing and generation of files, thereby improving efficiency of parsing tools, but the disclosure is not limited thereto.

According to exemplary embodiments, a non-transitory computer readable medium may be configured to store instructions for implementing the GPM 302. According to exemplary embodiments, the instructions, when executed, may cause a processor embedded within the GPM 302 or the computing device 301 to perform the following: access a repository to obtain a plurality of files each having a corresponding file format; format each file into a class-based logical hierarchy; create a Java model based on the formatted files having the class-based logical hierarchy, each file having a plurality of data and the Java model having file-level classes that contain a list of said plurality of data; generate Java annotations identifying each file type included in the file-level classes; inject the Java annotations into the file-level classes of the Java model to indicate how to process each file; call a method along with the file containing the data; and parse the file to read the data into the Java model injected with the Java annotations. The processor may be the same or similar to the processor 104 as illustrated in FIG. 1.

According to exemplary embodiments, the instructions, when executed, may further cause the processor embedded within the GPM 302 or the computing device 301 to perform the following: utilize a reflection method to search the file-level classes subjected for parsing that represent each file as the class-based logical hierarchy.

According to exemplary embodiments, the instructions, when executed, may, further cause the processor embedded within the GPM 302 or the computing device 301 to perform the following: generate files based on the Java model containing the data.

According to exemplary embodiments, the instructions, when executed, may further cause the processor embedded within the GPM 302 or the computing device 301 to perform the following: call a method having four input parameters, wherein the four input parameters include the file itself, a type of Java model to parse the file into, a character number in the file containing a field separator, and a character number in the file containing a line separator.

According to exemplary embodiments, the instructions, when executed, may further cause the processor embedded within the GPM 302 or the computing device 301 to perform the following: call a method having two input parameters, wherein the two input parameters include the file with the data and a type of Java model for the data to be read into.

Figure 4:
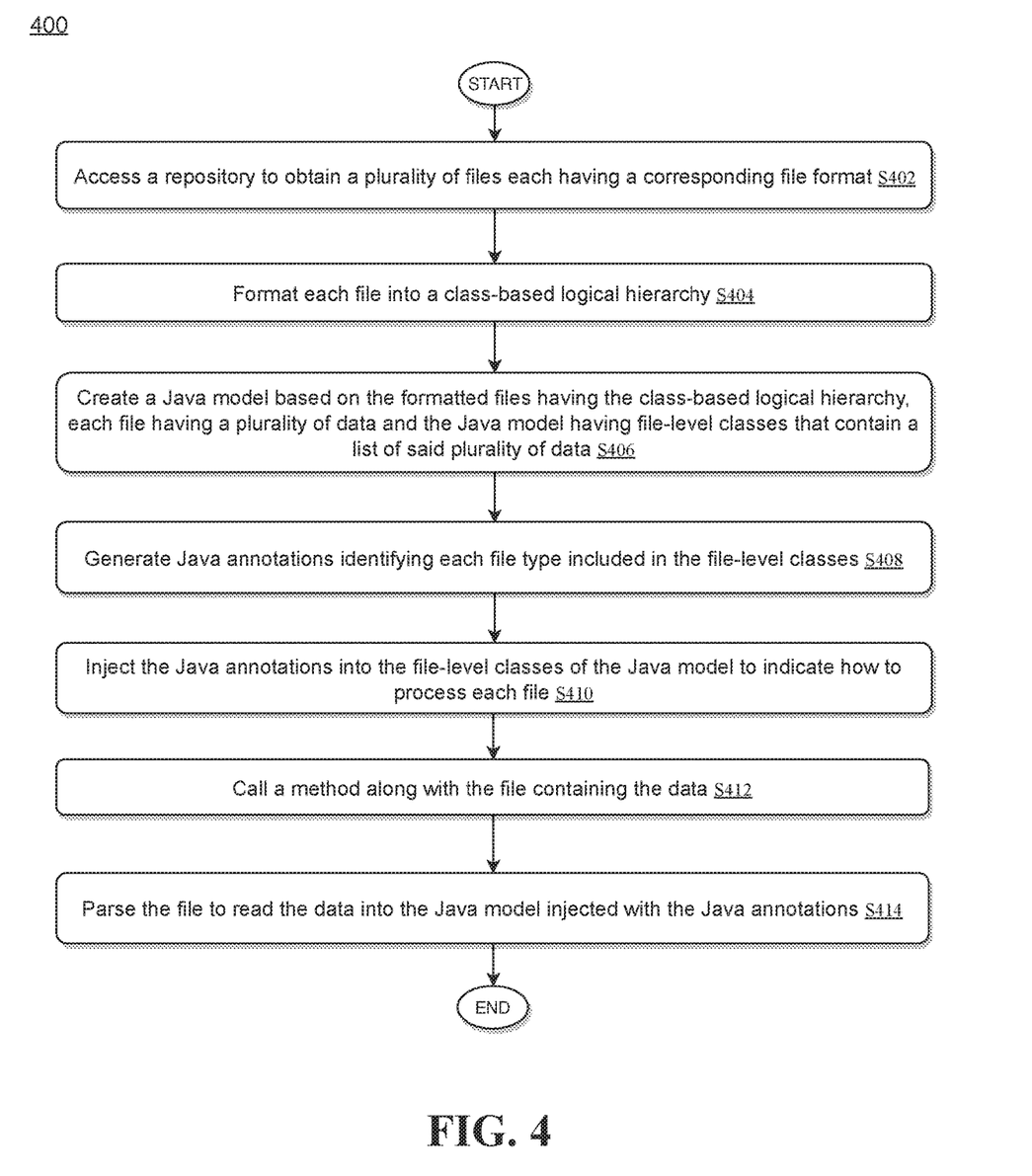
FIG. 4 illustrates a flow chart for implementing a generic parser module in accordance with an exemplary embodiment.

FIG. 4 illustrates a flow chart for implementing a generic parser module in accordance with an exemplary embodiment. The generic parser module may be the same or similar to the GPMs illustrated herein with reference to FIGS. 2-3, but the disclosure is not limited thereto.

In the process 400 of FIG. 4, at step S402, a repository may be accessed to obtain a plurality of files each having a corresponding file format.

At step S404, each file may be formatted into a class-based logical hierarchy.

At step S406, a Java model may be created based on the formatted files having the class-based logical hierarchy, each file having a plurality of data and the Java model having file-level classes that contain a list of said plurality of data.

At step S408, Java annotations may be generated identifying each file type included in the file-level classes.

At step S410, the Java annotations may be injected into the file-level classes of the Java model to indicate how to process each file.

At step S412, a method may be called along with the file containing the data.

At step S414, the file may be parsed to read the data into the Java model injected with the Java annotations.

According to exemplary embodiments, the process 400 may further include: utilizing a reflection method to search the file-level classes subjected for parsing that represent each file as the class-based logical hierarchy. The Java model may include a root level model that may indicate a file-level annotations and an interior field that may indicate the data of the file. The interior field may include a field order annotation along with a property indicating an order of each field.

According to exemplary embodiments, in in calling a method, the process 400 may further include: calling a method having four input parameters, wherein the four input parameters include the file itself, a type of Java model to parse the file into, a character number in the file containing a field separator, and a character number in the file containing a line separator.

According to exemplary embodiments, in in calling a method, the process 400 may further include: calling a method having two input parameters, wherein the two input parameters include the file with the data and a type of Java model for the data to be read into.

Although the invention has been described with reference to several exemplary embodiments, it is understood that the words that have been used are words of description and illustration, rather than words of limitation. Changes may be made within the pug w of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a generic parser module by utilizing one or more processors and one or more memories, the method comprising:
   accessing a repository to obtain a plurality of files each having a corresponding file format;
   formatting each file of the plurality of files into a class-based logical hierarchy;
   creating a Java model based on the formatted plurality of files having the class-based logical hierarchy, wherein each file of the plurality of files has a plurality of data and the Java model has file-level classes that contain a list of the plurality of data;
   generating Java annotations identifying each file type included in the file-level classes of the Java model;
   injecting the Java annotations into the file-level classes of the Java model to indicate how to process each file of the plurality of files;
   calling a method along with the file of the plurality of files containing the plurality of data; and
   parsing the file of the plurality of files to read the plurality of data into the Java model injected with the Java annotations.

2. The method according to claim 1, further comprising:
   utilizing a reflection method to search the file-level classes of the Java model subjected for parsing that represent each file of the plurality of files as the class-based logical hierarchy.

3. The method according to claim 1, wherein each file of the plurality of files is selected from one or more of the following file types: an electronic data interchange (EDI) file, a bank administration institute (BAI) file, and a Pascal (PAS) file.

4. The method according to claim 1, wherein the Java model comprises a root level model that indicates file-level annotations and an interior field that indicates the plurality of data of the file of the plurality of files.

5. The method according to claim 4, wherein the interior field includes a field order annotation along with a property indicating an order of each field.

6. The method according to claim 1, further comprising: generating files based on the Java model containing the plurality of data.

7. The method according to claim 1, wherein calling the method further comprises:
   calling the method having four input parameters, wherein the four input parameters include the file of the plurality of files itself, a type of Java model to parse the file of the plurality of files into, a character number in the file of the plurality of files containing a field separator, and a character number in the file of the plurality of files containing a line separator.

8. The method according to claim 1, wherein calling the method further comprises:
   calling the method having two input parameters, wherein the two input parameters include the file of the plurality of files with the plurality of data and a type of Java model for the plurality of data to be read into.

9. A system for implementing a generic parser module, comprising:
   a repository configured to store a plurality of files each having a corresponding file format; and
   a processor operatively connected to the repository via a communication network and configured to:
   access the repository to obtain the plurality of files;
   format each file of the plurality of files into a class-based logical hierarchy;
   create a Java model based on the formatted plurality of files having the class-based logical hierarchy, wherein each file of the plurality of files has a plurality of data and the Java model has file-level classes that contain a list of the plurality of data;
   generate Java annotations identifying each file type included in the file-level classes of the Java model;
   inject the Java annotations into the file-level classes of the Java model to indicate how to process each file of the plurality of files;
   call a method along with the file of the plurality of files containing the plurality of data; and
   parse the file of the plurality of files to read the plurality of data into the Java model injected with the Java annotations.

10. The system according to claim 9, wherein the processor is further configured to:
    utilize a reflection method to search the file-level classes of the Java model subjected for parsing that represent each file of the plurality of files as the class-based logical hierarchy.

11. The system according to claim 9, wherein each file of the plurality of files is selected from one or more of the following file types: an electronic data interchange (EDI) file, a bank administration institute (BAI) file, and a Pascal (PAS) file.

12. The system according to claim 9, wherein the Java model comprises a root level model that indicates file-level annotations and an interior field that indicates the plurality of data of the file of the plurality of files, and wherein the interior field includes a field order annotation along with a property indicating an order of each field.

13. The system according to claim 9, wherein the processor is further configured to:
    generate files based on the Java model containing the plurality of data.

14. The system according to claim 9, wherein the processor is further configured to call the method having four input parameters, and wherein the four input parameters include the file of the plurality of files itself, a type of Java model to parse the file of the plurality of files into, a character number in the file of the plurality of files containing a field separator, and a character number in the file of the plurality of files containing a line separator.

15. A non-transitory computer readable medium configured to store instructions for implementing a generic parser module, wherein the instructions, when executed by a processor, cause the processor to perform the following:

access a repository to obtain a plurality of files each having a corresponding file format;

format each file of the plurality of files into a class-based logical hierarchy;

create a Java model based on the formatted plurality of files having the class-based logical hierarchy, wherein each file of the plurality of files has a plurality of data and the Java model has file-level classes that contain a list of the plurality of data;

generate Java annotations identifying each file type included in the file-level classes of the Java model;

inject the Java annotations into the file-level classes of the Java model to indicate how to process each file of the plurality of files;

call a method along with the file of the plurality of files containing the plurality of data; and parse the file of the plurality of files to read the plurality of data into the Java model injected with the Java annotations.

16. The non-transitory computer readable medium according to claim 15, wherein the instructions, when executed by the processor, cause the processor to further perform the following:

utilize a reflection method to search the file-level classes of the Java model subjected for parsing that represent each file of the plurality of files as the class-based logical hierarchy.

17. The non-transitory computer readable medium according to claim 15, wherein the Java model comprises a root level model that indicates file-level annotations and an interior field that indicates the plurality of data of the file of the plurality of files, and wherein the interior field includes a field order annotation along with a property indicating an order of each field.

18. The non-transitory computer readable medium according to claim 15, wherein the instructions, when executed by the processor, cause the processor to further perform the following:

generate files based on the Java model containing the plurality of data.

19. The non-transitory computer readable medium according to claim 15, wherein the instructions, when executed by the processor, cause the processor to further perform the following:

call the method having four input parameters, wherein the four input parameters include the file of the plurality of files itself, a type of Java model to parse the file of the plurality of files into, a character number in the file of the plurality of files containing a field separator, and a character number in the file of the plurality of files containing a line separator.

20. The non-transitory computer readable medium according to claim 15, wherein each file of the plurality of files is selected from one or more of the following file types: an electronic data interchange (EDI) file, a bank administration institute (BAI) file, and a Pascal (PAS) file.

* * * * *